(12) United States Patent
Ruefer et al.

(10) Patent No.: US 7,306,841 B2
(45) Date of Patent: *Dec. 11, 2007

(54) PTFE MATERIAL WITH AGGREGATIONS OF NODES

(75) Inventors: Bruce G. Ruefer, Bozeman, MT (US); Leonard G. Marlow, Jr., Bozeman, MT (US); Rebecca U. Ruefer, Bozeman, MT (US); N. Joe Sharber, Bozeman, MT (US)

(73) Assignee: Bridger Biomed, Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/945,520

(22) Filed: Sep. 20, 2004

(65) Prior Publication Data

US 2005/0153121 A1   Jul. 14, 2005

Related U.S. Application Data

(63) Continuation of application No. 09/918,844, filed on Jul. 31, 2001, now abandoned, which is a continuation of application No. 09/373,348, filed on Aug. 12, 1999, now Pat. No. 6,342,294.

(51) Int. Cl.
   *B32B 5/22* (2006.01)
   *B32B 27/00* (2006.01)
(52) U.S. Cl. .............................. 428/317.9; 428/316.6; 428/421; 428/422
(58) Field of Classification Search ............. 428/317.9, 428/204, 316.6, 306.4, 317.5, 317.7, 422, 428/421
   See application file for complete search history.

(56) References Cited

U.S. PATENT DOCUMENTS

| | | |
|---|---|---|
| 3,953,566 A | 4/1976 | Gore |
| 4,025,679 A | 5/1977 | Denny |
| 4,082,893 A | 4/1978 | Okita |
| 4,187,390 A | 2/1980 | Gore |
| 4,208,745 A | 6/1980 | Okita |
| 4,283,448 A | 8/1981 | Bowman |
| 4,304,010 A | 12/1981 | Mano |

(Continued)

FOREIGN PATENT DOCUMENTS

DE   2417901   4/1974

(Continued)

OTHER PUBLICATIONS

Sperati, et al., "Flourine-Containing Polymers II Polytetrafluoroethylane," Fortschr. Hochpolym.—Forsch Bd. 2, 5. 465-495 (1961).

*Primary Examiner*—Jill Gray
(74) *Attorney, Agent, or Firm*—Wolf, Greenfield & Sacks, P.C.

(57) ABSTRACT

A novel polytetrafluoroethylene (PTFE) material includes a plurality of aggregates connected together by a plurality of relatively long fibrils. Each of the aggregates are formed of PTFE nodes that are connected together by relatively short fibrils. Preferably, the long fibrils have lengths of 500 to 1000 microns and the short fibrils have a lengths of 10 to 30 microns. The aggregates have densities of less than 2.0 grams per cubic centimeter which is lower than the densities of the solid PTFE nodes which have densities of about 2.0 to 2.2 grams per cubic centimeter.

12 Claims, 5 Drawing Sheets

U.S. PATENT DOCUMENTS

| | | | |
|---|---|---|---|
| 4,332,035 A | 6/1982 | Mano | |
| 4,385,093 A | 5/1983 | Hubis | |
| 4,478,665 A | 10/1984 | Hubis | |
| 4,482,516 A | 11/1984 | Bowman et al. | |
| 4,650,833 A | 3/1987 | Sakagami et al. | |
| 4,656,234 A | 4/1987 | Murayama et al. | |
| 4,713,070 A | 12/1987 | Mano | |
| 4,743,480 A | 5/1988 | Campbell et al. | |
| 4,816,339 A | 3/1989 | Tu et al. | |
| 4,819,478 A | 4/1989 | Melcher | |
| 4,820,787 A | 4/1989 | Kataoka et al. | |
| 4,824,898 A | 4/1989 | Sukigara et al. | |
| 4,849,285 A | 7/1989 | Dillon | |
| 4,859,383 A | 8/1989 | Dillon | |
| 4,876,051 A | 10/1989 | Campbell et al. | |
| 4,877,661 A | 10/1989 | House et al. | |
| 4,902,423 A | 2/1990 | Bacino | |
| 4,952,630 A | 8/1990 | Morgan et al. | |
| 5,024,671 A | 6/1991 | Tu et al. | |
| 5,026,513 A | 6/1991 | House et al. | |
| 5,064,593 A | 11/1991 | Tamaru et al. | |
| 5,071,609 A | 12/1991 | Tu et al. | |
| 5,194,154 A | 3/1993 | Moyer et al. | |
| 5,225,131 A | 7/1993 | Tamaru et al. | |
| 5,234,739 A | 8/1993 | Tanaru et al. | |
| 5,234,751 A | 8/1993 | Harada et al. | |
| 5,258,014 A | 11/1993 | Harada et al. | |
| 5,308,664 A | 5/1994 | House et al. | |
| 5,330,782 A | 7/1994 | Kanazawa | |
| 5,374,473 A | 12/1994 | Knox et al. | |
| 5,426,128 A | 6/1995 | Burger et al. | |
| 5,429,869 A | 7/1995 | McGregor et al. | |
| 5,433,909 A | 7/1995 | Martakos et al. | |
| 5,437,900 A | 8/1995 | Kuzowski | |
| 5,453,235 A | 9/1995 | Calcote et al. | |
| 5,462,781 A | 10/1995 | Zukowski | |
| 5,474,824 A | 12/1995 | Martakos et al. | |
| 5,476,589 A | 12/1995 | Bacino | |
| 5,480,711 A | 1/1996 | Ruefer | |
| 5,545,475 A | 8/1996 | Korleski | |
| 5,607,478 A | 3/1997 | Lentz et al. | |
| 5,620,763 A | 4/1997 | House et al. | |
| 5,641,566 A | 6/1997 | Kranzler et al. | |
| 5,665,114 A | 9/1997 | Weadock et al. | |
| 5,688,836 A | 11/1997 | Yamamoto et al. | |
| 5,718,973 A | 2/1998 | Lewis et al. | |
| 5,741,330 A | 4/1998 | Brauker et al. | |
| 5,800,512 A | 9/1998 | Lentz et al. | |
| 5,879,794 A | 3/1999 | Korleski | |
| 6,030,694 A | 2/2000 | Dolan et al. | |
| 6,033,758 A | 3/2000 | Kocher et al. | |
| 6,039,755 A * | 3/2000 | Edwin et al. | 632/1.15 |
| 6,099,791 A | 8/2000 | Shannon et al. | |
| 6,103,172 A | 8/2000 | Newman et al. | |
| 6,110,333 A | 8/2000 | Spethmann et al. | |
| 6,117,555 A | 9/2000 | Fujimori et al. | |
| 6,127,486 A | 10/2000 | Burger et al. | |
| 6,130,175 A | 10/2000 | Rusch et al. | |
| 6,133,165 A | 10/2000 | Tamaru et al. | |
| 6,143,675 A | 11/2000 | McCollam et al. | |
| 6,149,998 A | 11/2000 | Hettinga | |
| 6,162,885 A | 12/2000 | Ruefer | |
| 6,177,533 B1 | 1/2001 | Woodward | |
| 6,194,050 B1 | 2/2001 | Koerber et al. | |
| 6,194,074 B1 | 2/2001 | Wiesemann et al. | |
| 6,196,708 B1 | 3/2001 | Rogers | |
| 6,207,251 B1 | 3/2001 | Balsimo et al. | |
| 6,218,000 B1 | 4/2001 | Rudolf et al. | |
| 6,228,477 B1 | 5/2001 | Klare et al. | |
| 6,261,497 B1 | 7/2001 | Wong et al. | |
| 6,287,497 B1 | 9/2001 | Kawachi et al. | |
| 6,312,814 B1 | 11/2001 | Kolouch | |
| 6,342,294 B1 * | 1/2002 | Ruefer et al. | 428/317.9 |
| 6,388,033 B2 | 5/2002 | Noda et al. | |
| 6,410,084 B1 | 6/2002 | Klare et al. | |
| 6,436,533 B1 | 8/2002 | Heffner et al. | |
| 6,451,396 B1 | 9/2002 | Zumbrum et al. | |
| 6,454,744 B1 | 9/2002 | Spohn et al. | |
| 6,479,161 B1 | 11/2002 | Araki et al. | |
| 6,500,532 B1 | 12/2002 | Ruefer et al. | |
| 6,511,927 B1 | 1/2003 | Ellis et al. | |
| 6,518,360 B1 | 2/2003 | Ausen et al. | |
| 6,518,381 B2 | 2/2003 | Kobayashi et al. | |
| 6,521,697 B2 | 2/2003 | Miura et al. | |
| 6,524,334 B1 | 2/2003 | Thompson | |
| 6,531,559 B1 | 3/2003 | Smith et al. | |
| 6,547,814 B2 | 4/2003 | Edwin et al. | |
| 6,547,915 B2 | 4/2003 | Taylor et al. | |
| 6,548,612 B2 | 4/2003 | Smith et al. | |
| 6,582,113 B2 | 6/2003 | Rogers | |
| 6,599,997 B2 | 7/2003 | Araki et al. | |
| 6,616,876 B1 | 9/2003 | Labrecque et al. | |
| 6,620,190 B1 | 9/2003 | Colone | |
| 6,638,468 B1 | 10/2003 | Hill et al. | |
| 6,673,455 B2 | 1/2004 | Zumbrum et al. | |
| 6,712,919 B2 | 3/2004 | Ruefer et al. | |
| 6,737,158 B1 * | 5/2004 | Thompson | 428/306.6 |
| 2001/0006268 A1 | 7/2001 | Delrosario et al. | |
| 2001/0008672 A1 | 7/2001 | Norvell et al. | |
| 2001/0018096 A1 | 8/2001 | Klare | |
| 2001/0021756 A1 | 9/2001 | Noda et al. | |
| 2001/0033925 A1 | 10/2001 | Trapp et al. | |
| 2002/0001704 A1 | 1/2002 | Ruefer et al. | |
| 2002/0001705 A1 | 1/2002 | Ruefer et al. | |
| 2002/0004107 A1 | 1/2002 | Rogers | |
| 2002/0011684 A1 | 1/2002 | Bahar et al. | |
| 2002/0025747 A1 | 2/2002 | Rock et al. | |
| 2002/0031628 A1 | 3/2002 | Zumbrum et al. | |
| 2002/0045041 A1 | 4/2002 | Dillon et al. | |
| 2002/0051879 A1 | 5/2002 | Tamai et al. | |
| 2002/0053367 A1 | 5/2002 | Kamikawa et al. | |
| 2002/0076542 A1 | 6/2002 | Kramer et al. | |
| 2002/0096246 A1 | 7/2002 | Sennet et al. | |
| 2002/0124953 A1 | 9/2002 | Sennett et al. | |
| 2002/0132104 A1 | 9/2002 | Urakami et al. | |
| 2002/0140181 A1 | 10/2002 | Werner | |
| 2002/0147486 A1 | 10/2002 | Soukup et al. | |
| 2002/0161149 A1 | 10/2002 | Kobayashi et al. | |
| 2002/0169265 A1 | 11/2002 | Kobayashi et al. | |
| 2002/0197481 A1 | 12/2002 | Jing et al. | |
| 2002/0197924 A1 | 12/2002 | Halley et al. | |
| 2003/0010423 A1 | 1/2003 | Nakakado et al. | |
| 2003/0012905 A1 | 1/2003 | Zumbrum et al. | |
| 2003/0017775 A1 | 1/2003 | Sowinski et al. | |
| 2003/0054155 A1 | 3/2003 | Nomi et al. | |
| 2003/0062644 A1 | 4/2003 | Oyama et al. | |
| 2003/0062650 A1 | 4/2003 | Martakos et al. | |
| 2003/0065115 A1 | 4/2003 | Kobayashi et al. | |
| 2003/0067097 A1 | 4/2003 | Yu et al. | |
| 2003/0069343 A1 | 4/2003 | Smith et al. | |
| 2003/0088264 A1 | 5/2003 | Spohn et al. | |
| 2003/0102587 A1 | 6/2003 | Kobayashi et al. | |
| 2003/0104741 A1 | 6/2003 | Kelmartin et al. | |
| 2003/0109654 A1 | 6/2003 | Kobayashi et al | |
| 2003/0113546 A1 | 6/2003 | Cho et al. | |
| 2003/0118836 A1 | 6/2003 | Lee et al. | |
| 2003/0139806 A1 | 7/2003 | Haverkost et al. | |
| 2003/0204270 A1 | 10/2003 | Berman et al. | |
| 2003/0207118 A1 | 11/2003 | Fukushi | |
| 2003/0216531 A1 | 11/2003 | Aten et al. | |
| 2003/0228463 A1 | 12/2003 | Abusleme et al. | |
| 2003/0230834 A1 | 12/2003 | Wynne et al. | |
| 2004/0019167 A1 | 1/2004 | Smith et al. | |
| 2004/0038038 A1 | 2/2004 | Yeung | |

| | | | | | |
|---|---|---|---|---|---|
| 2004/0084304 A1 * | 5/2004 | Thompson ............ 204/296 | JP | 11-80705 | 7/1989 |
| | | | JP | 04-353534 | 8/1992 |
| | FOREIGN PATENT DOCUMENTS | | WO | WO94/19170 | 9/1994 |
| EP | 0813331 | 12/1997 | | | |
| EP | 1107749 | 5/2003 | * cited by examiner | | |

PTFE MATERIAL WITH AGGREGATIONS OF NODES

RELATED APPLICATIONS

This application is a continuation of U.S. patent application Ser. No. 09/918,844, filed Jul. 31, 2001, now abandoned, which is a continuation of U.S. patent application Ser. No. 09/373,348, filed August 12, 1999, now issued as U.S. Pat. No. 6,342,294, both of which are hereby incorporated by reference in their respective entireties.

STATEMENT REGARDING FEDERALLY SPONSORED RESEARCH OR DEVELOPMENT

Not Applicable.

BACKGROUND OF THE INVENTION

The present invention relates generally to composite articles formed from expanded polytetrafluoroethylene ("ePTFE") materials, and particularly to a composite article made up of a plurality of polytetrafluoroethylene ("PTFE") components having differing expansion characteristics.

Conventional micro porous ePTFE articles are utilized for many useful articles, such as filters, fabrics, gaskets, electrical insulation and human implant devices. These ePTFE articles are typically produced by blending PTFE resin with a lubricant, compressing the blended resin into a billet, extruding the billet into an extrudate, drying the extrudate, calendering the extrudate (if desired), stretching or expanding the extrudate, and sintering the expanded extrudate to form the final article. The ePTFE article can be manufactured in any extruded shape, including sheets, tubes, rods or filaments.

The micro porous structure of known ePTFE articles is characterized by a plurality of nodes that are connected together by a plurality of fibrils. The nodes are essentially solid PTFE, having a density of about 2.0-2.2 grams per cubic centimeter, whereas the density of the expanded material is less than about 2.0 grams per cubic centimeter. Typically, the fibrils of ePTFE materials average in length from about 0.1 microns to about 100 microns, and the volume of the structure occupied by the fibrils has a density ranging from about 2.0 grams per cubic centimeter to less than 0.5 grams per cubic centimeter. The shape, size and orientation of the nodes and fibrils within the structure can be controlled by varying the expansion rate, expansion ratio, number of expansion axes and other processing parameters to yield many different structures. It is also known that properties such as the expandability and microstructure of the expanded article vary with the molecular weight, particle size and other physical characteristics of the PTFE resin. Various methods of producing ePTFE with differing physical properties are described in the literature, e.g. U.S. Pat. No. 3,953,566, to Gore, herein incorporated by reference.

For some applications it is desirable to provide an article having an asymmetric microstructure in which the fibrils adjacent one surface of the article are relatively short in comparison to the fibrils disposed adjacent the opposite surface of the article. However, attempted solutions to this technical problem have been unsatisfactory due to cost and functionability considerations.

BRIEF SUMMARY OF THE INVENTION

It is an object of the present invention to overcome the technical problems found in conventional ePTFE articles exhibiting asymmetric microstructures, and to provide a composite material that is made up of a plurality of PTFE components having differing expansion characteristics and that possesses an advantageous asymmetric microstructure.

In accordance with these and other objects of the present invention, a multi-layered article, such as a sheet, film or tube, of ePTFE is provided which includes at least two different component layers. At least one of the layers includes anode-fibril structure presenting substantially full-density nodes that are connected together by a first plurality of relatively short fibrils. At least one additional layer of the article includes a plurality of aggregates connected together by a plurality of relatively long fibrils having an average length of greater than about 100 microns. Each of the aggregates are formed of ePTFE including substantially full density nodes that are connected together by a second plurality of relatively short fibrils. Preferably, the short fibrils have an average length of 10-100 microns. A method of producing the article includes the steps of extruding a first PTFE material to form a first extrudate, and extruding a second PTFE material to form a second extrudate, wherein the first PTFE material is highly expandable relative to the second PTFE material. A stack is formed from at least one layer of the first extrudate and at least one layer of the second extrudate, and the stack is expanded and sintered to form the article.

The article of the present invention includes an asymmetric structure in which the lengths of the fibrils provided in the structure are longer adjacent one surface of the article than adjacent the opposite surface. Numerous advantages are realized from this construction. For example, by providing a material comprised of at least one layer of a first PTFE material of a relatively high expandability, and at least one layer of a second PTFE material of a relatively low expandability, it is possible to provide an article having an asymmetric microstructure that varies in fibril length across the thickness of the article. As such, the article has application as a biomedical material, a filter architecture, a textile fabric, a biotech cell-culture substrate, and the like.

BRIEF DESCRIPTION OF THE SEVERAL VIEWS OF THE DRAWING

The preferred embodiment of the present invention is described below with reference to the attached drawing figures, wherein.

DETAILED DESCRIPTION OF THE INVENTION

Figure 6:
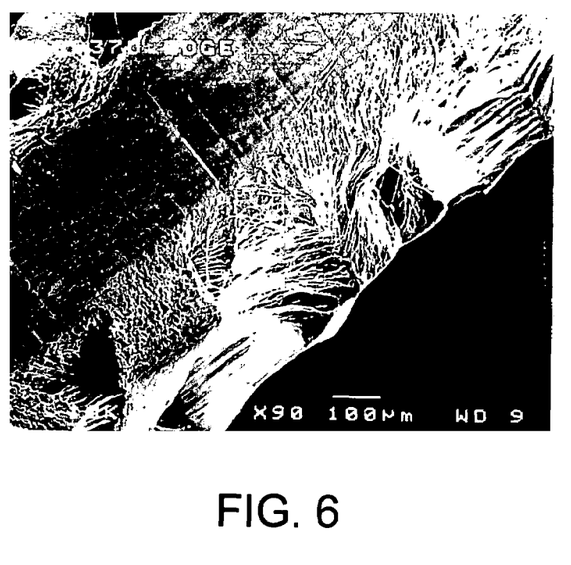
FIG. 6 is a scanning electron microscope photograph at 90× of the composite PTFE article, illustrating a side edge thereof.

A composite article constructed in accordance with the preferred embodiment of the present invention is illustrated in FIG. 6, and broadly includes two component layers that are referred to herein as first and second or inner and outer layers in order to facilitate an understanding of the invention. It is understood that the layers can be reversed or provided in any other desired arrangement, and that more than one layer of either or both of the components, or of a different component, may be provided without departing from the scope of the present invention.

As described in detail below, the article of the present invention is formed of at least two different PTFE components having differing expansion properties. These components are extruded separately, stacked in layers, brought into intimate contact by means of calendering or compressing in a press or die, expanded, and finally sintered. The resulting article has an asymmetric fibril structure, a unique macro-structure, and a unique micro-structure.

The individual components of the inventive article may be brought into intimate contact by any known means, such as by calendering the layered sheets together or by compressing layered sheets in a press or die. While the methods detailed herein illustrate a process for making a composite sheet material, it is not intended to limit the scope of the present invention to sheet materials. Other useful articles, such as rods, tubes, or other layered configurations can be made in a similar manner.

The multi-layered sheet is preferably comprised of two or more layers of separately extruded resins of differing expandability, referred to herein as type H and type L tapes, wherein type H tapes are those exhibiting an expansion characteristic that renders the material more highly expandable than a type L tape. These tapes are stacked in layers, brought into intimate contact by means such as a press or by calendaring, expanded below the crystalline melt point of PTFE, and then sintered.

Examples of expansion characteristics that render the PTFE more or less expandable than another include the molecular weight of the PTFE resin, the particle sizes in the PTFE resin, the lubricant level during extrusion, the dryness of expanded resin, the dye configuration during extrusion, calendering, and expansion conditions including temperature, expansion rates, and expansion speeds. Thus, a PTFE resin with a relatively high molecular weight might be selected to form the layer with the intended higher expandability, whereas a PTFE resin with a lower molecular weight might be selected to form the less expandable layer. Similarly, a PTFE resin with relatively large particle sizes could be selected to make one layer more expandable, whereas a PTFE resin with relatively small particle sizes might be selected to form the layer with the lesser expandability.

A specific formulation of PTFE paste can be produced by extruding a material that is highly expandable (hereinafter referred to as "type H"). The expanded sintered articles produced from this type H material have a normal node and fibril structure as is known, with fibrils typically ranging from about 5 microns to about 10 microns. An extrudate sheet produced from a different formulation of PTFE paste (hereinafter referred to as "type L") can produce a PTFE material that is not as highly expandable. The expanded sintered articles produced from this type L material are difficult to make without fracturing, but when made the structure is a typical node-fibril configuration as is conventional.

When type H and L stacked tapes are expanded together at relatively high expansion ratios, the type H component of the article has unexpectedly long fibril lengths, ranging from about 10 to 30 microns. The L type component does not fracture as it would if expanded alone under the given expansion conditions. Instead, it forms a unique large scale aggregate-fibril structure including aggregates having diameters ranging in size from about 500 to 1000 microns, and fibrils connecting the aggregates together and ranging in average length from about 100 to 1000 microns, and preferably from about 500 to 1000 microns. The aggregates, rather than being essentially solid, are actually composed of a fine scale node-fibril structure, with nodes ranging in size from about 10 microns×10 microns and fibrils ranging in average length from about 10 to 30 microns. Thus, the large scale nodes have a density of less than full density, i.e. less than about 2.0 grams per cubic centimeter, while the fine scale nodes are understood to have a density of about 2.0 to 2.2 grams per cubic centimeter as is known in prior art.

The article of the preferred embodiment has two key characteristics. First, the node-fibril structure of the layer or layers formed from the more expandable type H tape is similar to the node-fibril structure known in the prior art. That is, the nodes are essentially solid PTFE, having a density of about 2.0 to 2.2 grams per cubic centimeter. However, the structure of the layer or layers formed from the less expandable type L tape has a large-scale structure of aggregates and fibrils, not similar in appearance to the previously known node-fibril structures. Further, the large-scale aggregates are actually composed of smaller nodes and fibrils; hence the large scale aggregates have a density of less than about 2.0 grams per cubic centimeter. As such, each aggregate is actually comprised of ePTFE, and these aggregates are connected together by fibrils of a length substantially longer than the fibrils defining the fine scale node-fibril structure of each aggregate.

A second key characteristic of the composite article of the present invention is that the fibril lengths of the two component layers differ, with the type L tape layer having unusually long fibrils connected between the aggregates, while the type H tape component layer has more typical fibril lengths. Furthermore, the type H component layer was found to have unexpected and longer fibril lengths in the composite article than would have been formed had it been expanded and sintered alone.

Figure 1:
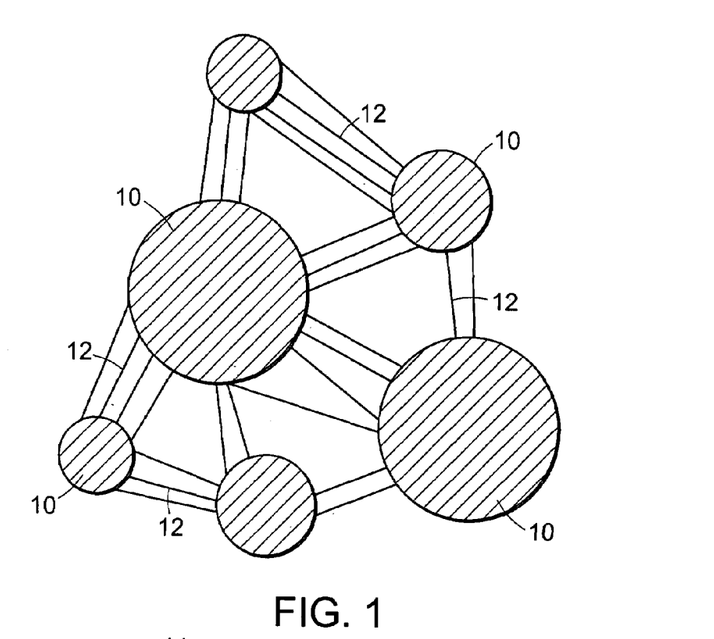
FIG. 1 is a schematic view of a first layer of a composite PTFE article constructed in accordance with the preferred embodiment, illustrating a node-fibril structure of the first layer.
Figure 5:
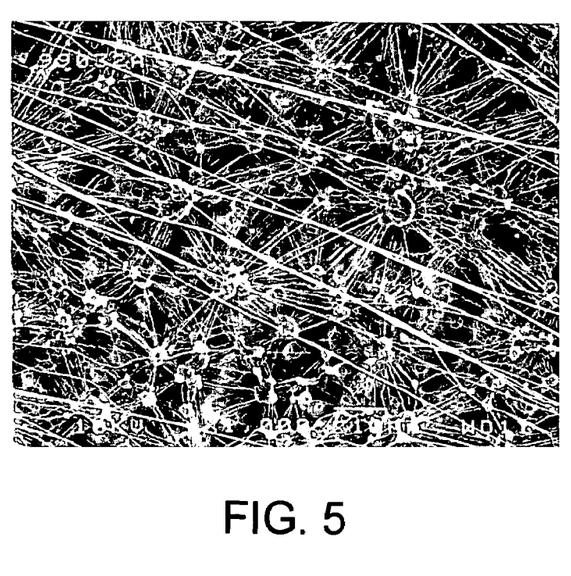
FIG. 5 is a scanning electron microscope photograph at 1000× of the composite PTFE article, illustrating the underlying node-fibril structure of the first layer.

Turning to FIG. 1, the inner layer of the article is illustrated as including a node-fibril structure in which a plurality of nodes 10 are connected together by fibrils 12. The nodes 10 are made of high-density or non-expanded PTFE more typical to normal ePTFE and exhibit a density of about 2.0-2.2 gm/cc. The fibrils 12 of the inner layer connect the nodes together, and typically average 10-30 microns in length. FIG. 5 is a scanning electron microscope photograph at a magnification of 1000×, illustrating the node-fibril structure of the inner layer through the relatively long fibrils of the aggregate-fibril structure of the outer layer.

Figure 2:
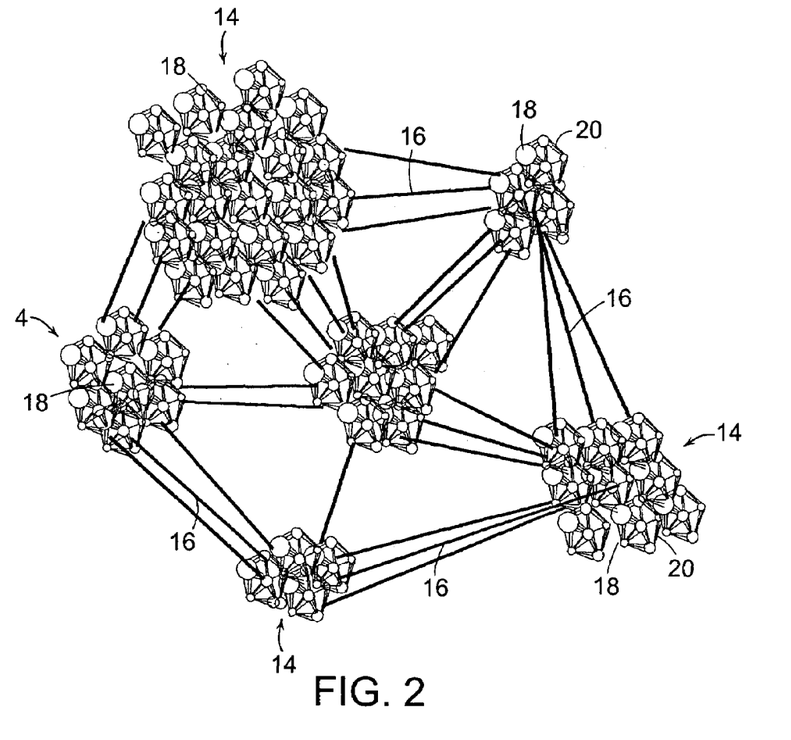
FIG. 2 is a schematic view of a second layer of the composite PTFE article, illustrating an aggregate-fibril structure of the second layer.
Figure 9:
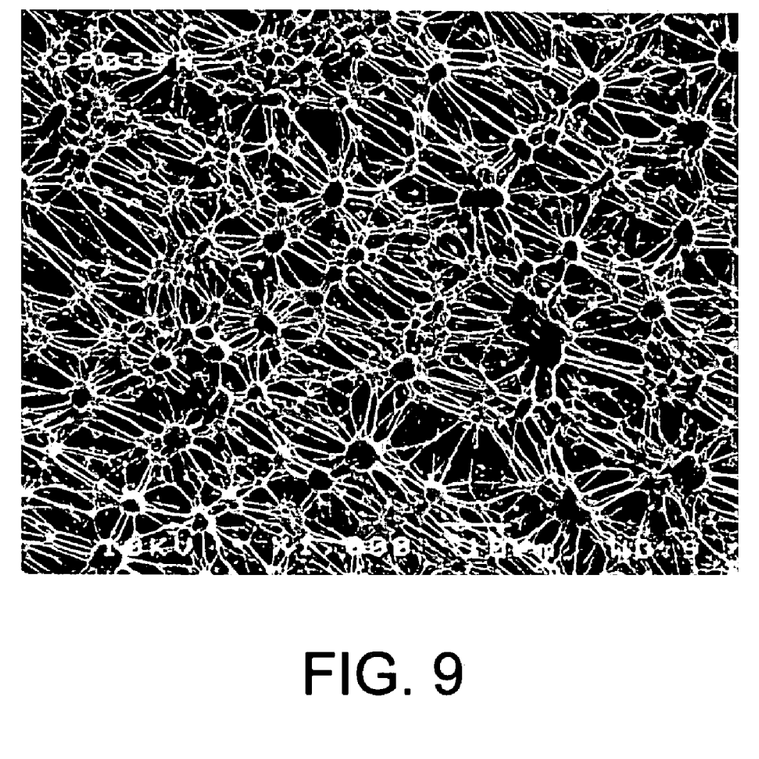
FIG. 9 is a scanning electron microscope photograph at 1000× of the composite PTFE article, illustrating the node-fibril structure of an aggregate of the second layer.

As shown in FIG. 2, the outer layer of the article exhibits an expanded aggregate-fibril structure including aggregates 14 connected to one another and to the inner layer by very long fibrils 16. As shown in FIG. 9, the aggregates each include a fine scale node-fibril structure that resembles the node-fibril structure of the inner layer, including a plurality of nodes 18 connected together by fibrils 20. The nodes 18 are made of high-density or non-expanded PTFE more typical to normal ePTFE and exhibit a density of about 2.0-2.2 gm/cc. The fibrils 20 within the aggregates connect the nodes 18 together, and typically average 10-30 microns in length.

Figure 3:
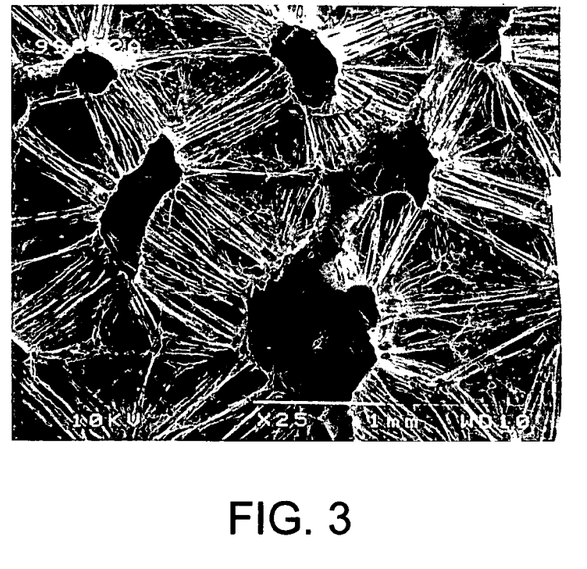
FIG. 3 is a scanning electron microscope photograph at 25× of the second layer of the composite PTFE article, illustrating ePTFE aggregates connected to each other with relatively long fibrils.
Figure 4:
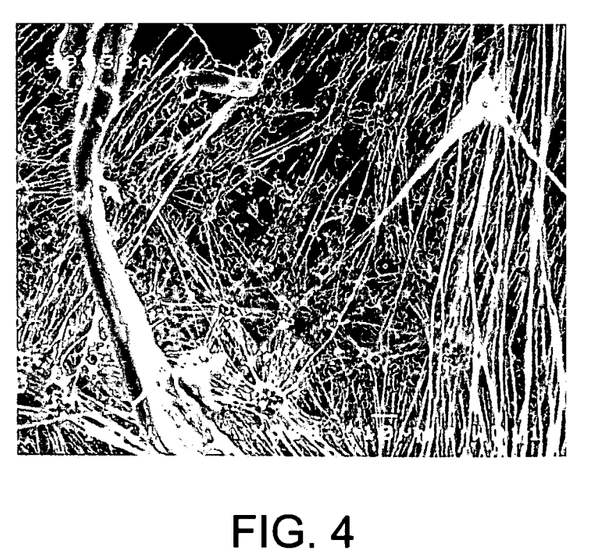
FIG. 4 is a scanning electron microscope photograph at 500× of the composite PTFE article, illustrating the underlying node-fibril structure of the first layer.

As shown in FIG. 3, the relatively long fibrils are connected between the aggregates of the outer layer and average from about 500-1000 microns (about 0.5 to 1 mm) in length. In addition, as illustrated in FIG. 4, the long fibrils of the outer layer connect downward to the underlying node-fibril structure of the first or inner layer, connecting not only the aggregates to one another, but to the underlying inner layer of the article as well.

Figure 7:
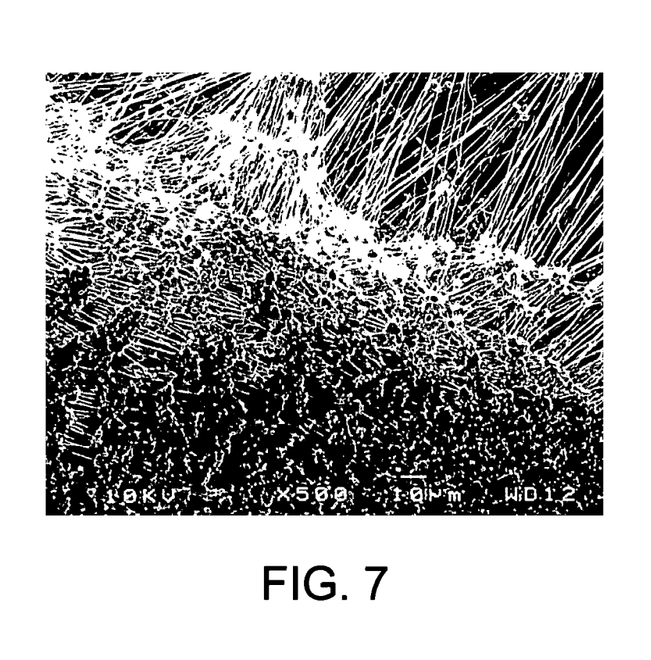
FIG. 7 is a scanning electron microscope photograph at 500× of the composite PTFE article, illustrating a transition area between the aggregates and the long fibrils of the second layer of the article.
Figure 8:
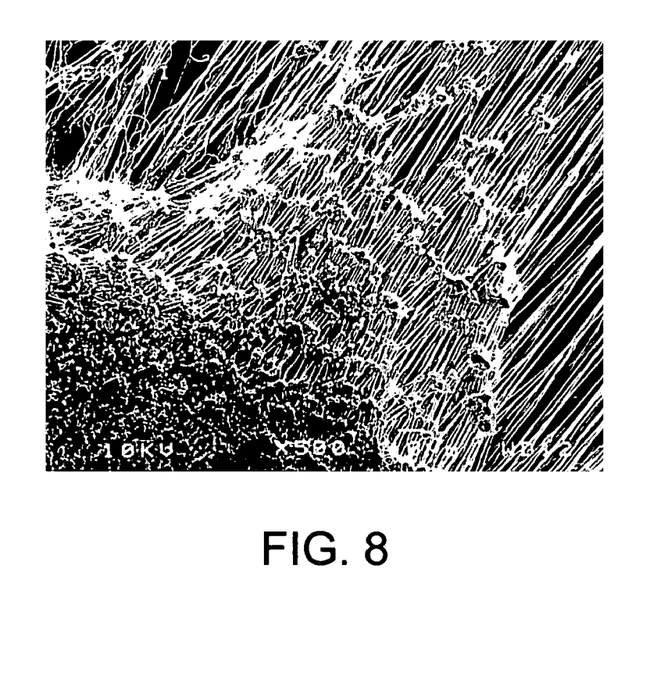
FIG. 8 is a scanning electron microscope photograph at 500× of the composite PTFE article, illustrating the transition area between an aggregate and the long fibrils of the second layer of the article, and depicting the node-fibril structure of the aggregate.

The transition area between an aggregate and the fibrils of the outer layer is illustrated in FIG. 7, and includes both the fine node-fibril structure of the aggregate and the relatively long fibrils that connect the aggregate to other aggregates. As shown in FIG. 8, the high density nodes of the node-fibril structure of the aggregate are connected together by longer and longer fibrils in the transition area, demonstrating the manner in which the material is stretched during formation to create the relatively long fibrils of the layer.

Turning to FIG. 6, the second or outer layer of the composite article is connected to the underlying or inner layer by a large number of the relatively long fibrils of the outer layer across the entire area of the article between the aggregates. The existence of this high density area of the relatively long fibrils in the absence of nodes is considered novel to the present invention, and the advantages of this construction are apparent to those of skill in the art. For example, the high number of fibrils connected between the layers ensures attachment of the outer layer to the underlying structure, enhancing overall strength, and the fibrils function as a natural and stress-dissipating region during flexure of the article.

The method of manufacturing the article of the preferred embodiment broadly includes the steps of extruding two different PTFE components to form first and second extrudates, one of which possesses an expansion characteristic that differs from the other.

A stack is formed from at least one layer of each of the different components, and is calendered to a desired thickness to form a multi-layered sheet. Subsequent to calendering, the sheet is heated in an oven to a temperature below the crystalline melt temperature to remove the mineral spirits, and dried. Thereafter, the dried sheet is expanded, e.g. by a radial expansion process or the like, and is sintered above the crystalline melt temperature of the PTFE to "lock" the structure.

As mentioned above, the suitable characteristics for the invention include a novel macro-structure of expanded ePTFE juxtaposed to a fine or small micro-structure of ePTFE. Macro-structures that exhibit about a 1 mm average fibril length connecting expanded ePTFE aggregates overlying a micro-structure of 20-30 micron fibrils connecting full density PTFE nodes can be made by heat processing the aforementioned expanded assemblies.

EXAMPLE 1

A PTFE resin was blended with a typical amount of mineral spirits (about 100 cc per pound of resin) to form a paste, and the paste was billeted, extruded and calendered in a conventional manner to make a tape of the type H PTFE component. The type H PTFE tape was then stacked into 10 layers, and the stack was calendered to a final thickness of about 0.1 inches. The multi-layered sheet resulting from the calendering step was dried in an oven to remove the mineral spirits, and dried. Thereafter, the dried sheet was radially expanded at an expansion ratio of about 5:1 and at an expansion rate of about 200%/second. The resulting first ePTFE article was sintered above the crystalline melt temperature of the PTFE to "lock" the structure.

A PTFE resin was blended with a high amount of mineral spirits (about 200 cc per pound of resin) and the paste was billeted, extruded, and calendered in a conventional manner to make a tape of the type L PTFE component. The type L PTFE tape was then stacked, calendered, dried, expanded, and sintered as described with reference to the type H PTFE tape, forming a second ePTFE article.

A stack was made of 8 sheets of the type H PTFE component, and a sheet of the type L PTFE component was added to both the top and bottom of the stack. The multi-layered stack was then calendered to a final thickness of about 0.1 inches, forming a sheet that was subsequently dried in an oven to remove the mineral spirits. The dried sheet was then radially expanded and sintered as described above with reference to the first and second ePTFE articles. The results are shown in Table 1.

TABLE 1

| Expansion at 200%/sec and 5:1 ratio | "type H" PTFE Tape Material | "type L" PTFE Tape Material | Preferred Invention PTFE Tape Material |
| --- | --- | --- | --- |
| Result | Expanded into typical high density node fibril microstructure. | Fractured and did not expand. | Macro-structure of expanded nodes connected by long fibrils. Superimposed over Microstructure |
| Fibril Length | 5-15-micron | No result. | About 1000 micron macrostructure over a 20-30 micron microstructure. |
| Density | ~0.4 gm/cc | No result. | About 0.2 gm/cc |
| Tensile Strength | About 2000 psi. | No result | About 700 psi. |

The physical characteristics of the preferred invention are given in Table 2.

TABLE 2

| Result of expansion: | Expanded and formed unique node-fibril structure |
| --- | --- |
| Outer Structure: | Coarse "mm" structure ePTFE; rough to the touch |
| Inner structure: | Fine "micron" structure ePTFE; smooth to the touch |

Although the present invention has been described with reference to the preferred embodiment illustrated in the attached drawing, it is noted that substitutions may be made and equivalents employed herein without departing from the scope of the following claims.

The invention claimed is:

1. A composite expanded polytetrafluoroethylene article comprising: at least one layer of a first polytetrafluoroethylene material including a first plurality of nodes interconnected by a first plurality of short fibrils;
    at least one layer of a second polytetrafluoroethylene material including a plurality of aggregates of nodes and fibrils, each of the aggregates comprising a second plurality of nodes interconnected by a second plurality of short fibrils; and
    a plurality of long fibrils interconnecting the aggregates in the at least one layer of a second polytetrafluoroethylene material and connecting the aggregates in the at least one layer of a second polytetrafluoroethylene material with selected ones of the first plurality of nodes in the at least one layer of a first polytetrafluoroethylene material.

2. The composite article of claim 1 wherein each of the first plurality of fibrils has an average length of about 10-100 microns.

3. The composite article as recited in claim 1 wherein each of the second plurality of fibrils has an average length of about 10-100 microns.

4. The composite article of claim 1 wherein each of the plurality of long fibrils has an average length of about 100 to 1000 microns.

5. The composite article of claim 4 wherein each of the plurality of long fibrils has an average length of about 500-1000 microns.

6. The composite article of claim 1 wherein the first and second plurality of short fibrils and the plurality of long fibrils are all formed by radial expansion.

7. The composite article of claim 1 wherein each of the first plurality of nodes has a density of about 2.0-2.2 grams per cubic centimeter.

8. The composite article of claim 1 wherein each of the plurality of aggregates has a density of less than 2.0 grams per cubic centimeter.

9. The composite article of claim 1 wherein each of the second plurality of nodes has a density of about 2.0-2.2 grams per cubic centimeter.

10. The composite article of claim 1 wherein the first polytetrafluoroethylene material is highly expandable relative to the second polytetrafluoroethylene material.

11. The composite article of claim 10 wherein the first polytetrafluoroethylene material includes a greater molecular weight than the second polytetrafluoroethylene material such that the first polytetrafluoroethylene material is more expandable than the second polytetrafluoroethylene material.

12. The composite article of claim 1 wherein the first polytetrafluoroethylene material is formed from particles of a first size and the second polytetrafluoroethylene material is formed from particles of a second size smaller than the first size such that the first polytetrafluoroethylene material is more expandable than the second polytetrafluoroethylene material.

* * * * *